(12) United States Patent
Vaisanen (10) Patent No.: US 7,380,629 B2
(45) Date of Patent: Jun. 3, 2008

(54) ADJUSTABLE SEAT FOR A SNOWMOBILE

(75) Inventor: Esa Vaisanen, Rovaniemi (FI)

(73) Assignee: BRP Finland Oy, Rovaniemi (FI)

( * ) Notice: Subject to any disclaimer, the term of this patent is extended or adjusted under 35 U.S.C. 154(b) by 407 days.

(21) Appl. No.: 11/254,817

(22) Filed: Oct. 21, 2005

(65) Prior Publication Data

US 2006/0086552 A1    Apr. 27, 2006

Related U.S. Application Data

(60) Provisional application No. 60/620,687, filed on Oct. 22, 2004.

(51) Int. Cl.
*B62M 27/02* (2006.01)
(52) U.S. Cl. .................. 180/190; 297/215.14
(58) Field of Classification Search ................ 180/182, 180/190; 297/215.13, 215.14
See application file for complete search history.

(56) References Cited

U.S. PATENT DOCUMENTS 7,008,014 B1 * 3/2006 Johnson et al. ........ 297/215.12
7,080,706 B2 * 7/2006 Vaisanen .................... 180/190
2007/0034435 A1 * 2/2007 Berg et al. ................. 180/190

OTHER PUBLICATIONS

Cover Page of 2001 Aki-Doo Skandic Brochure.
http://www.industriesjack.com/1enprod2a.htm.
http://www.industriesjack.com/efiche2a.htm.
http://www.industriesjack.com/1enprod2b.htm.

\* cited by examiner

*Primary Examiner*—Kevin Hurley
(74) *Attorney, Agent, or Firm*—Osler, Hoskin & Harcourt LLP (57) ABSTRACT

An adjustable seat for a snowmobile has a base having an upper sitting portion for accommodating a driver and a slidable coupling for sliding the seat relative to a chassis of the snowmobile. The seat is movable between a forward position and a rearward position. Threaded fasteners or other connectors are employed to secure the adjustable seat to the chassis in an ergonomic position. The adjustable seat thus accommodates drivers of different height and/or drivers who adopt different postures when riding by comfortably seating the driver on the sweet spot of the seat regardless of the driver's height or his driving posture.

16 Claims, 11 Drawing Sheets

ADJUSTABLE SEAT FOR A SNOWMOBILE

CROSS-REFERENCE TO RELATED APPLICATIONS

The present application claims the benefit of priority to U.S. Provisional application 60/620,687 filed on Oct. 22, 2004, which is incorporated herein by reference.

FIELD OF THE INVENTION

The present invention generally relates to a snowmobile and, more particularly, to a seat for a snowmobile.

BACKGROUND OF THE INVENTION

In a straddle-type vehicle such as a snowmobile, a driver conventionally sits on a seat having a substantially flat top surface with an upwardly extending back support at a rear end of the seat. The snowmobile seat typically extends over the snowmobile's chassis, extending rearward from a forwardly mounted gas tank to a rearward end of the vehicle. Ordinarily, the snowmobile seat is designed to accommodate the driver approximately midway along the vehicle so that the driver's mass, when straddling the seat and holding the handlebars, preferably aligns (in the vertical plane) with the center of mass of the vehicle, which generally enhances driver stability and vehicle performance.

When seated on the straddle-type seat of a snowmobile, the driver will usually prefer to sit with his buttocks and lower back supported by the top surface of the seat and an upwardly extending back support, respectively. This position is most comfortable because it provides the most support and positional stability. This spot could be referred to as the "Sweet Spot" since some seats have a high-quality foam padding in this area to increase comfort. Due to cost constraints, usually only a portion of the snowmobile seat has a "sweet spot" made of high-quality, high-comfort foam.

Although these prior-art snowmobile seats have been utilized for many years, they are sub-optimal in terms of comfort and ergonomics for at least two main reasons.

First, drivers near the two extremes of the human scale are sub-optimally accommodated. In other words, a driver with short arms and legs will tend not to sit in the same spot on the seat as a driver with long arms and legs, therefore making it difficult (or expensive) to comfortably accommodate all sizes of drivers on the "sweet spot" of the seat.

Second, there are two types of driving positions available on current snowmobiles. Certain models offer a driving posture in which the driver's knees are forward of his ankles and the hips are above the knees, while other models offer a different driving posture where the driver's knees are rearward of his ankles and the hips are below the knees. Although each vehicle is specific to one of the two particular driving postures, one may attempt to switch between these two driving postures thus driver is not on the "sweet spot" in both postures. Alternatively, an enlarged sweet spot that comfortably accommodates the driver is also generally considered impracticable because of the high cost of manufacturing a seat with an enlarged sweet spot.

In either of these scenarios, the prior-art snowmobile seats are inadequate because the drivers of varying height and/or drivers who adopt different driving postures are not, at all times, comfortably seated on the sweet spot of the seat.

Some snowmobile seats include an adjustable backrest support where the backrest or a portion thereof can be inclined at various angles. However, the sweet spot of the seat, upon which the driver sits, remains fixed. Thus, the aforementioned problems are not mitigated by the snowmobile seats having the adjustable backrest supports.

Therefore, there remains a need for a seat for a snowmobile which comfortably and stably accommodates a driver of different heights and/or a driver who adopts different driving postures.

SUMMARY OF THE INVENTION

It is an object of the present invention to provide an adjustable seat for a snowmobile that comfortably and stably accommodates different drivers who adopt different driving postures.

In accordance with one aspect of the present invention, an adjustable seat for a snowmobile includes a base having an upper sitting portion for accommodating a driver. The adjustable seat also includes a slidable coupling for sliding the seat relative to a chassis of the snowmobile, the seat being movable between a forward position and a rearward position. The adjustable seat further includes at least one connector for securing the adjustable seat to the chassis.

In accordance with another aspect of the present invention, a snowmobile has a chassis including a chassis; an engine disposed on the chassis at a forward end thereof, the chassis having footrests outwardly extending from either side thereof for receiving feet of a driver; at least one ski linked to the chassis by a front suspension system; a steering device disposed on the chassis forward of the seat and being operatively connected to the at least one ski for steering the snowmobile; a drive track disposed below the chassis and connected to a rear suspension system, said drive track being operatively connected to the engine for propulsion of the snowmobile; and an adjustable seat having the features described in the preceding paragraph.

In accordance with yet another aspect of the present invention, a method of adjusting a seat for ergonomically accommodating a driver on a snowmobile includes the steps of sliding an adjustable seat between a forward position and a rearward position; and securing the adjustable seat to preclude movement of the seat relative to the chassis.

Other features and advantages of the present invention will be better understood with reference to the preferred embodiment described hereinafter.

BRIEF DESCRIPTION OF THE DRAWINGS

Having thus generally described the nature of the present invention, reference will now be made to the accompanying drawings by way of illustration showing a preferred embodiment, in which.

DETAILED DESCRIPTION OF THE PREFERRED EMBODIMENT

Figure 1:
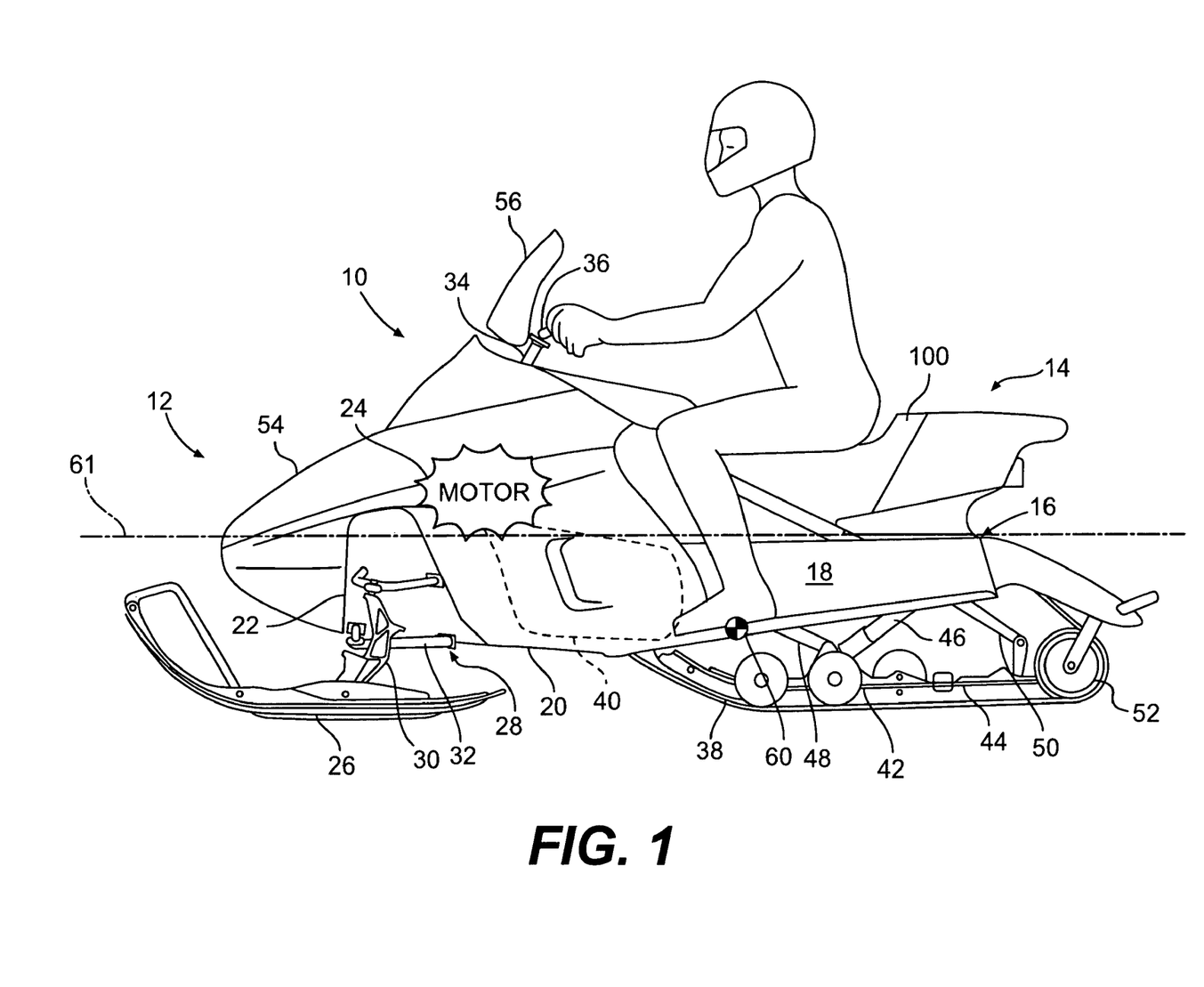
FIG. 1 is a side view of a snowmobile incorporating an embodiment of the present invention.

Referring now to FIG. 1, a snowmobile incorporating an embodiment of the present invention is designated generally by reference numeral 10. Although certain aspects of the present invention are applicable in other types of vehicles, the present invention has particular utility in connection with snowmobiles.

The snowmobile 10 includes a forward end 12 and a rearward end 14 which are defined consistently with the travel direction of the vehicle. The snowmobile 10 includes a chassis 16 which normally includes a rear tunnel 18, an engine cradle portion 20 and a front suspension assembly portion 22. An engine 24, which is schematically illustrated in FIG. 1, is carried by the engine cradle portion 20 of the chassis 16. A ski and steering assembly (not indicated) is provided, in which two skis 26 are positioned at the forward end 12 of the snowmobile 10 and are attached to the front suspension assembly portion 22 of the chassis 16 through a front suspension assembly 28. The front suspension assembly 28 includes ski legs 30, supporting arms 32 and ball joints (not shown) for operatively joining the respective ski legs 30, supporting arms 32 and a steering column 34. The steering column 34 at its upper end is attached to a steering device such as a handlebar 36 which is positioned forward of a rider and behind the engine 24 to rotate the ski legs 30 and thus the skis 26, in order to steer the vehicle.

An endless drive track 38 is positioned at the rear end 14 of the snowmobile 10 and is disposed under tunnel 18, being connected operatively to the engine 24 through a belt transmission system 40 which is schematically illustrated by broken lines in FIG. 1. Thus, the endless drive track 38 is driven to run about a rear suspension assembly 42 for propulsion of the snowmobile 10. The rear suspension assembly 42 includes a pair of slide rails 44 in sliding contact with the endless drive track 38. The rear suspension assembly 42 also includes one or more shock absorbers 46 which may further include a coil spring (not shown) surrounding the individual shock absorbers 46. Front and rear suspension arms 48 and 50 are provided to attach the slide rails 44 to the chassis 16. One or more idler wheels 52 are also provided in the rear suspension assembly 42.

At the front end 12 of the snowmobile 10, fairings 54 enclose the engine 24 and the belt transmission system 40, thereby providing an external shell that not only protects the engine 24 and the belt transmission system 40, but can also be decorated to make the snowmobile 10 more aesthetically pleasing. Typically, the fairings 54 include a hood (not indicated) and one or more side panels which can be opened to allow access to the engine 24 and the belt transmission system 40 when this is required, for example, for inspection or maintenance of the engine 24 and/or the belt transmission system 40. In the particular snowmobile 10 shown in FIG. 1, the side panels can be opened along a vertical axis to swing away from the snowmobile 10. A windshield 56 may be connected to the fairings 54 near the front end 12 of the snowmobile 10 or directly to the handlebar 36. The windshield 56 acts as a wind screen to lessen the force of the air on the rider while the snowmobile 10 is moving.

The engine 24 is a type of internal combustion engine that is supported on the chassis 16 and is located at the engine cradle portion 20. The internal construction of the engine 24 may be of any known type, however the engine 24 drives an engine output shaft (not shown) that rotates about a horizontally disposed axis that extends generally transversely to a longitudinal centerline 61 of the snowmobile 10. The engine output shaft drives the belt transmission system 40 for transmitting torque to the endless drive track 38 for propulsion of the snowmobile 10.

An adjustable seat 100 in accordance with embodiments of the present invention is positioned atop the chassis and extends from the rear end 14 of the snowmobile 10 to the fairings 54. A rear portion of the adjustable seat 100 may include a storage compartment or can be used to accommodate a passenger seat (not indicated). Two footrests 60 are positioned on opposite sides of the snowmobile 10 below the adjustable seat 100 to accommodate the driver's feet.

Figure 2:
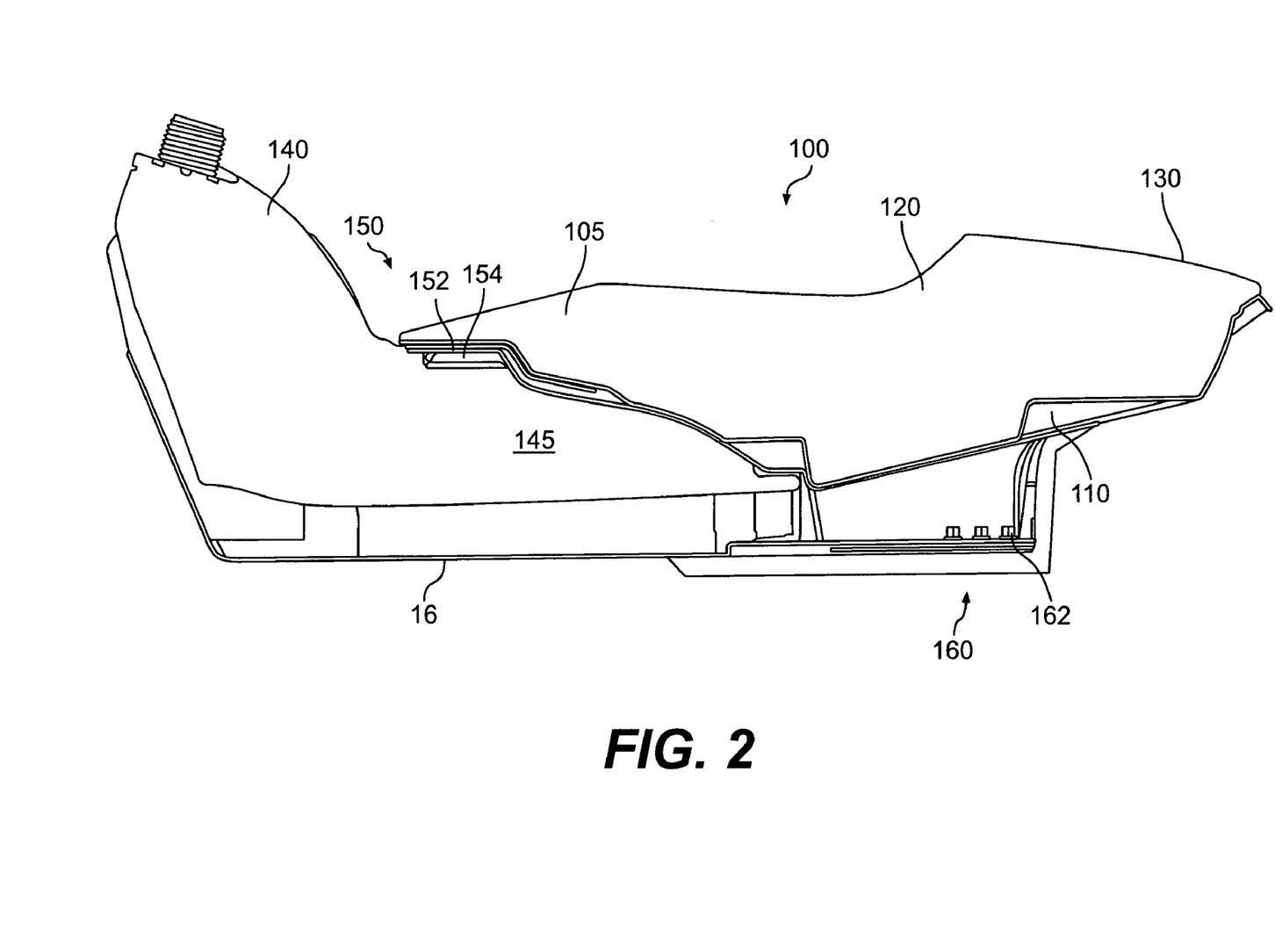
FIG. 2 is a side view of an adjustable seat in accordance with an embodiment of the present invention.

FIG. 2 is a side elevation view of the adjustable seat 100 in accordance with an embodiment of the present invention. The adjustable seat 100 is a straddle-type seat having a base 110 typically made of molded plastic as is known in the art. The plastic base 110 supports a foam padding 120 defining an upper sitting portion for accommodating a driver. The foam padding 120 includes a high-quality, high-comfort foam over a delimited portion of the seat. This high-comfort foam defines a "sweet spot" for maximum driver comfort. As is known in the art, the base and padding are usually covered by a wrapping or cover 130 made of treated leather or a synthetic waterproof leather-like material.

As shown in FIG. 2, a front portion 105 of the adjustable seat 100 is molded to interface with a rear portion 145 of a fuel tank 140. The adjustable seat 100 is slidably coupled to the fuel tank 140 via a slidable coupling 150. The slidable coupling 150 enables sliding of the adjustable seat 100 relative to the chassis 16 of the snowmobile 10. In other words, the adjustable seat 100 can be adjusted (i.e., displaced or linearly moved) between a forward position and a rearward position. It is to be understood that the adjustable seat either can adopt a plurality of fixed, discrete positions (in an incremental or stepwise manner) or it can be variably adjusted (in a "stepless" manner) to any desired position between front and rear extremities or stops.

The adjustable seat 100 also includes at least one connector 160, e.g. a bolt 162, for securing the adjustable seat 100 to the chassis 16. The connector(s) will be described below in greater detail.

For the embodiment shown in FIG. 2, the slidable coupling 150 is a tongue-and-slot connection. Alternatively, the slidable coupling 150 can be any prismatic joint having a first member slidably constrained for linear motion within a second member. In the embodiment illustrated in FIG. 2, a tongue 152 protrudes from the front of the adjustable seat for slidingly engaging a rearwardly facing slot 154 in the fuel tank 140.

Figure 3:
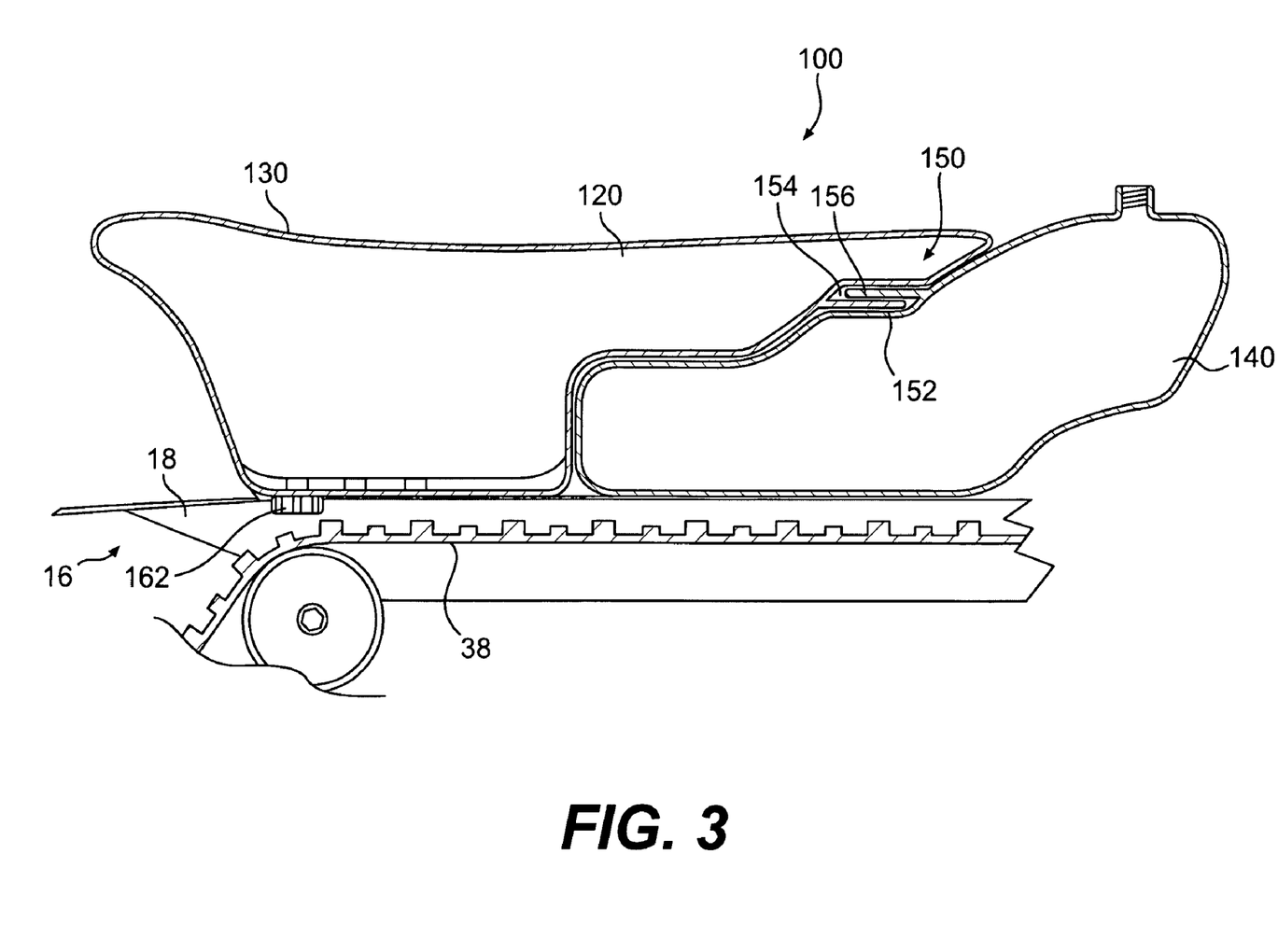
FIG. 3 is a side view of the adjustable seat secured in a forward position.

FIG. 3 shows a side elevation view of the adjustable seat 100 secured to the chassis 16 of the snowmobile 10. In this figure, the adjustable seat 100 is shown in the forward position. The adjustable seat 100 is secured to the chassis with threaded fasteners 162, such as bolts or screws. As shown in FIG. 3, the tongue 152 protrudes from the adjustable seat 100. A plate 156 covers the U-shaped cavity that is molded into the fuel tank 140. The plate 156 and cavity define the slot 154 into which the tongue 152 slides.

Figure 4:
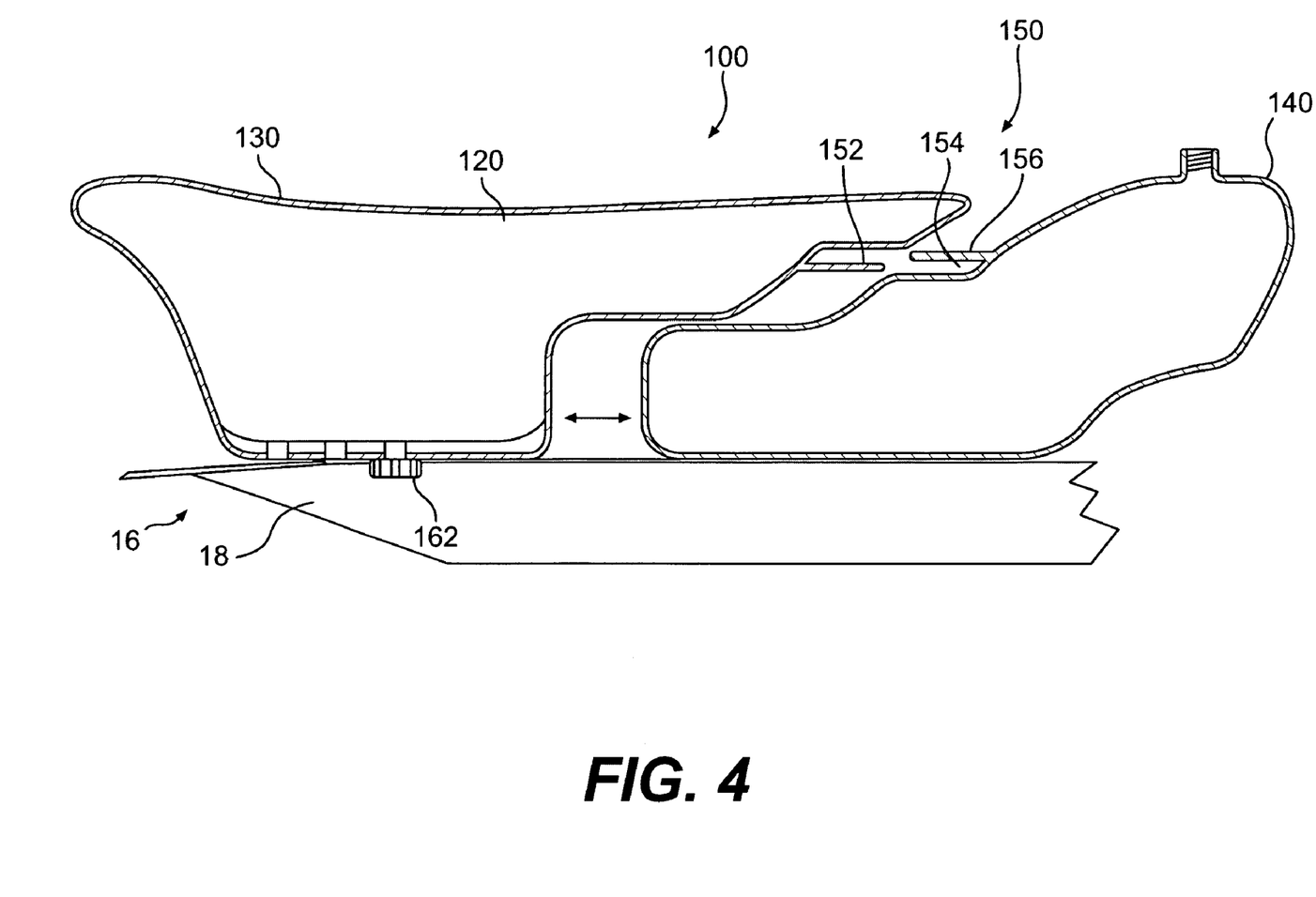
FIG. 4 is a side view of the adjustable seat secured in a rearward position with threaded fasteners.

FIG. 4 shows a side elevation view of the adjustable seat 100 secured to the chassis 16 in the rearward position. Again, in this embodiment, the adjustable seat 100 is secured to the chassis 16 with threaded fasteners 162, such as bolts or screws. As noted above, the plate 156 covers the U-shaped indentation in the fuel tank 140 to define the slot 154 into which the tongue 152 slides. As shown in FIG. 4, when the adjustable seat 100 is backed into the rearmost position, it is preferable that the tongue remain at least partially inside the slot to prevent possible misalignment of the tongue and slot.

Figure 5:
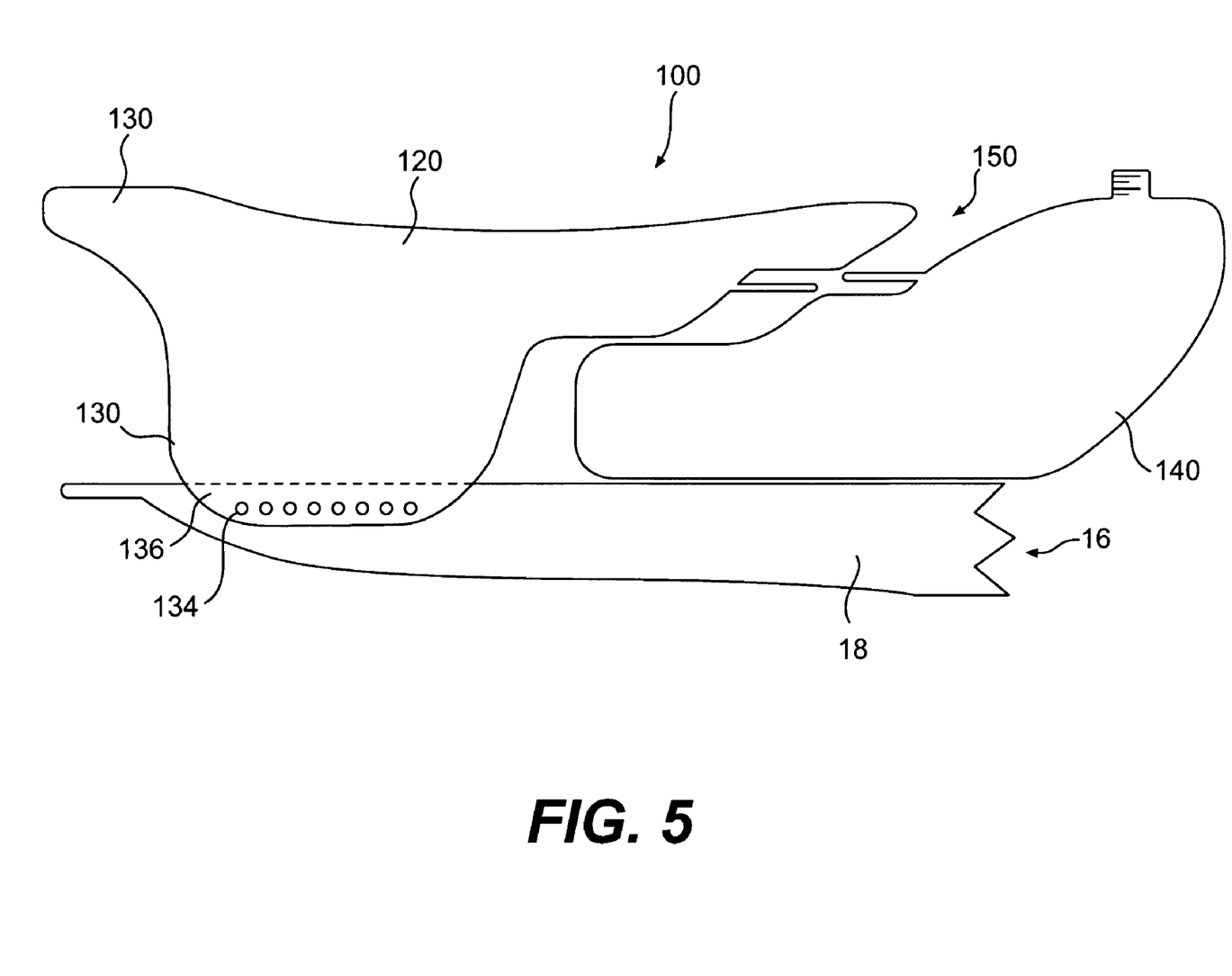
FIG. 5 is a side view of the adjustable seat secured in a rearward position with snaps.
Figure 6:
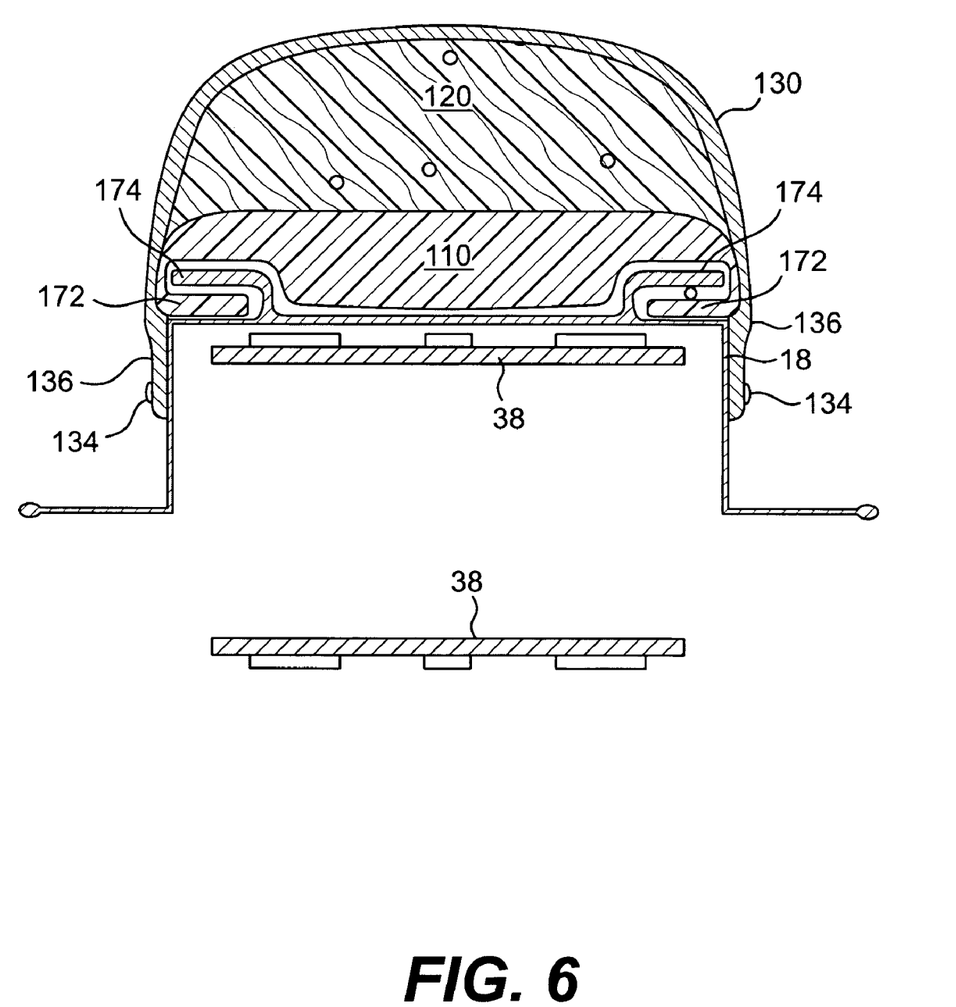
FIG. 6 is a cross-sectional view of the adjustable seat shown in FIG. 5.

FIG. 5 shows a side elevation view of the adjustable seat 100, again in a rearward position, secured to the chassis 16 with a plurality of buttons or snaps 134 located on a downwardly depending skirt-like portion 136 of a leather seat cover 130 that wraps over the foam padding 120 and the plastic base 110 as shown in FIG. 6. The snaps 134 enable a driver to rapidly detach the cover 130 and readjust the position of the seat 100 relative to the chassis 16. The snaps 134 (or buttons) located on the downwardly depending skirt-like portion 136 can be snapped onto the tunnel of the chassis 16 for securing the seat 100 relative to the chassis 16. The snaps 134 can be easily and quickly snapped off for readjusting the position of the seat 100 relative to the chassis 16. Other known types of quick connectors, fasteners or locking devices can be used as connectors in lieu of the bolts or snap-on buttons.

Figure 7:
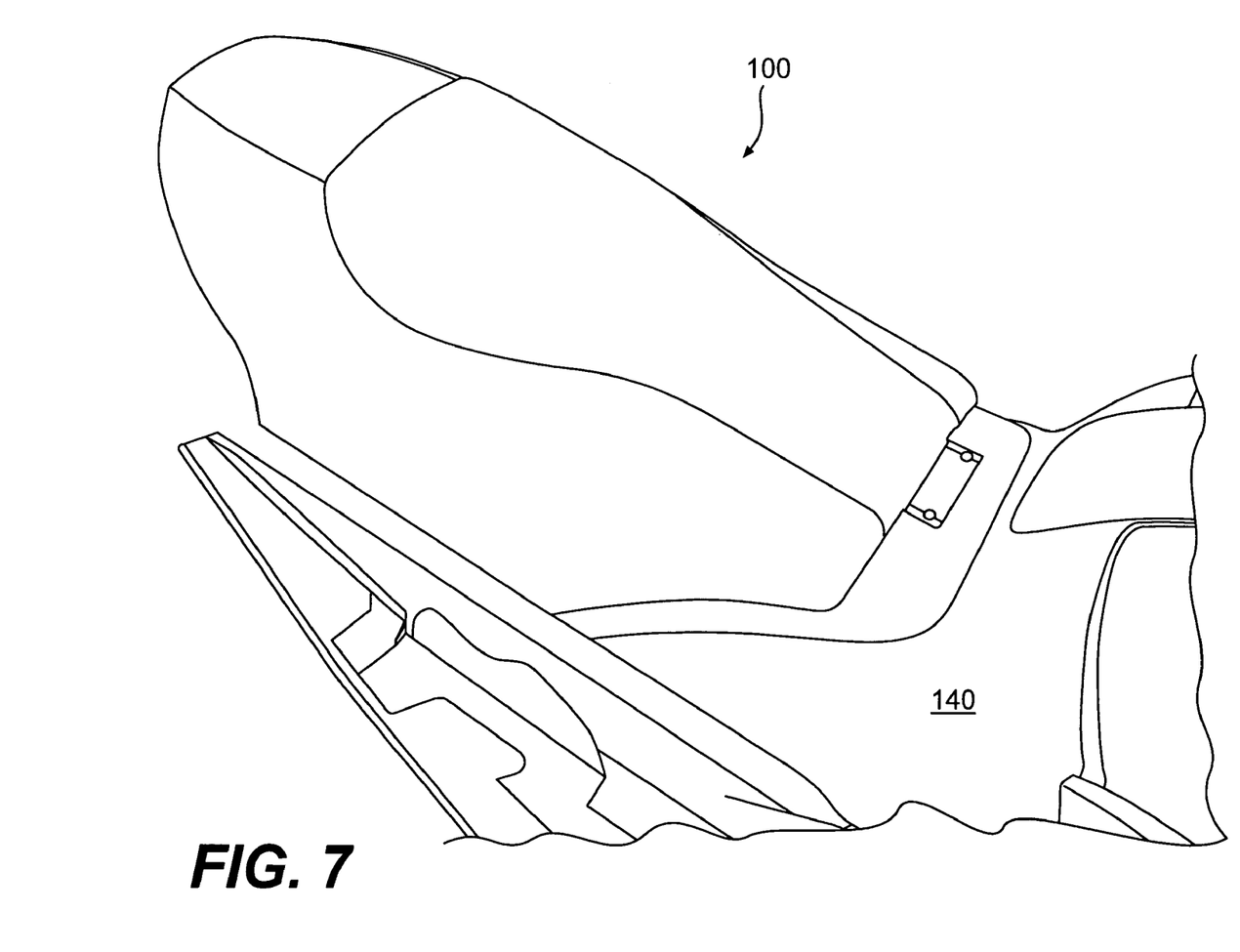
FIG. 7 is a perspective view of the adjustable seat in the rearward position.
Figure 8:
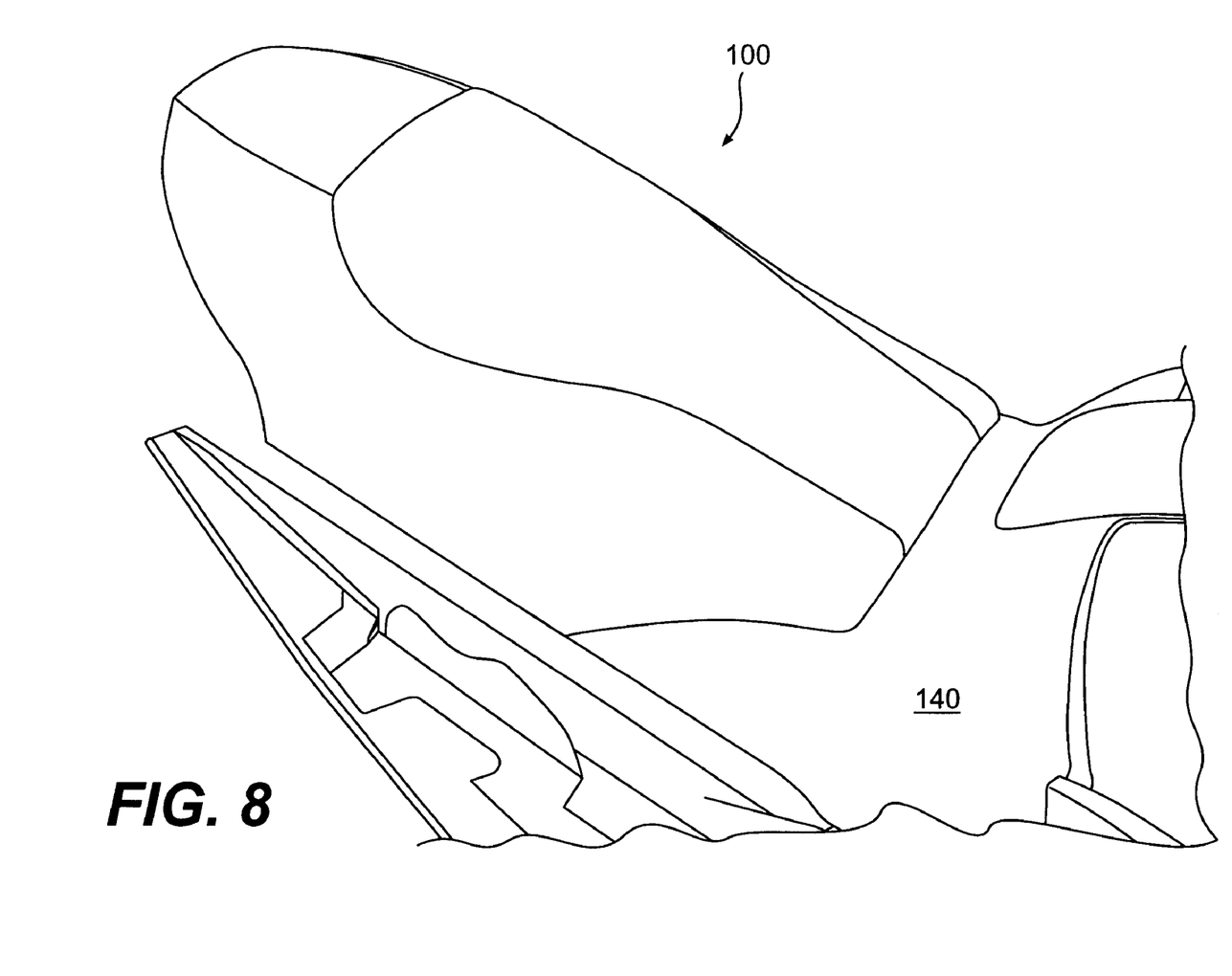
FIG. 8 is a perspective view of the adjustable seat in the forward position.

FIG. 7 and FIG. 8 show the adjustable seat 100 in the rearward and forward positions, respectively. It is to be understood that the adjustable seat 100 can be secured relative to the chassis not only at the rearward and forward extremities but also (optionally) at a plurality of intermediate positions. Indeed, in the embodiment shown in FIG. 7 and FIG. 8, three discrete positions are available. Markings such as XL, L and M (for extra large, large and medium) can be inscribed on the side of the chassis to indicate the position of the seat (corresponding, for example, to the size of the driver). Alternatively, markings can be inscribed to indicate seat positions corresponding to various driving postures, e.g. "cruising posture", "racing posture", etc.

Figure 9:
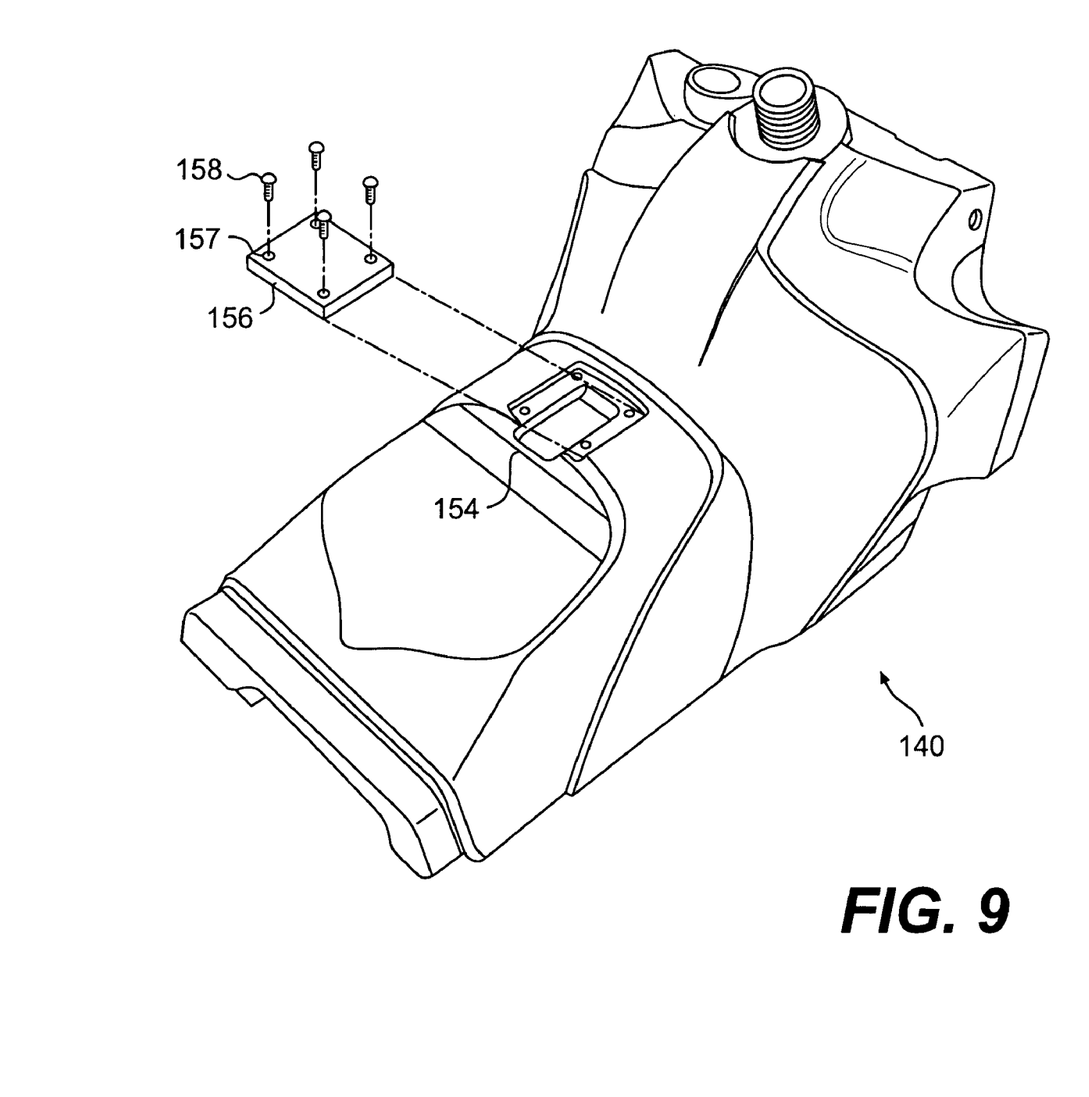
FIG. 9 is a perspective view of a fuel tank having a molded cavity and corresponding cover plate defining a slot for slidably receiving a tongue from the seat.

FIG. 9 shows a fuel tank 140 with a slot 154 for receiving a tongue (not shown in this figure) in accordance with one embodiment of the present invention. The fuel tank 140 is molded to have an indentation, depression or cavity over which the covering plate 156 is affixed. In one embodiment, the cavity is U-shaped so as to receive a tongue with rounded edges. As shown in FIG. 9, four holes are bored and tapped (threaded) into the fuel tank 140 to receive the threaded fasteners 158 for affixing the plate 156 to the fuel tank 140. The plate 156 is preferably made of metal or plastic and has a plurality of holes 157 through which threaded fasteners 158 are inserted in order to fasten the plate 156 over the U-shaped cavity to form the slot 154.

Figure 10:
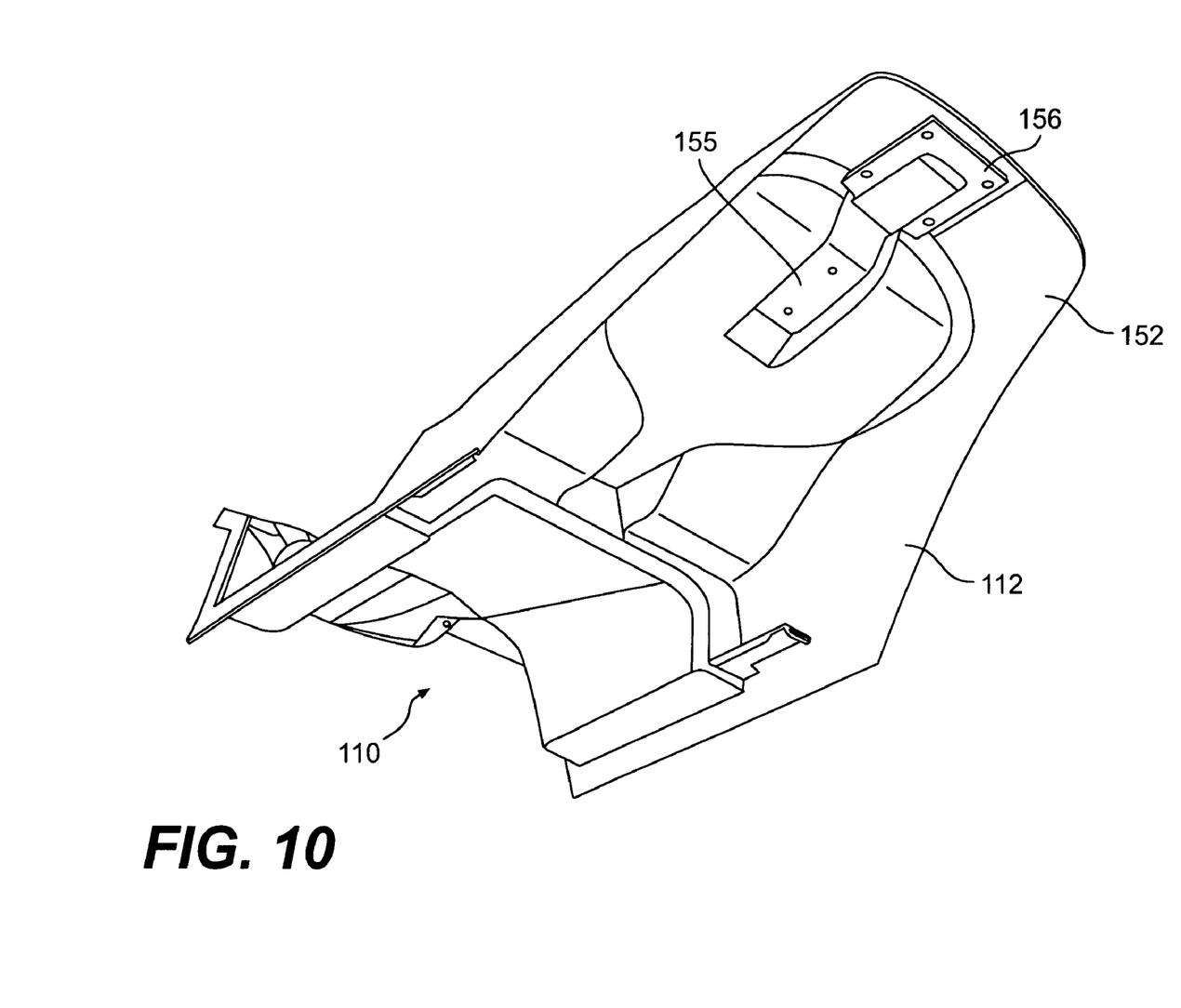
FIG. 10 is a perspective view of an underside of the adjustable seat.

FIG. 10 illustrates an underside 112 of the base 110 of the adjustable seat 100 in accordance with one embodiment of the present invention. As shown in FIG. 10, the tongue 152 is fastened to the underside 112 of the base 110 via a tongue-holding bracket 155. The bracket is preferably fastened to the base using a plurality of threaded fasteners, although persons of ordinary skill in the art will appreciate that other means of fastening may be suitably employed. The tongue-holding bracket 155 is shaped to fit flush with the underside 112 of the base 110 thereby enabling stable connection of the tongue-holding bracket 155 to the base 110. The tongue-holding bracket 155 holds the tongue 152 away from the underside 112 in a spaced-apart, substantially parallel posture that enables the tongue 152 to fit (and thereafter slide) into the slot in the fuel tank. The tongue 152 is preferably made of metal or high-strength plastic. The tongue 152 and slot 154 are manufactured with mutual tolerances (e.g. a sliding fit tolerance) so that the tongue 152 slides freely within the slot 154 but is nonetheless constrained to move only in a single degree of freedom, i.e. the tongue is constrained to translate or slide relative to the slot, but cannot move vertically or laterally nor can it rotate about an axis.

Figure 11:
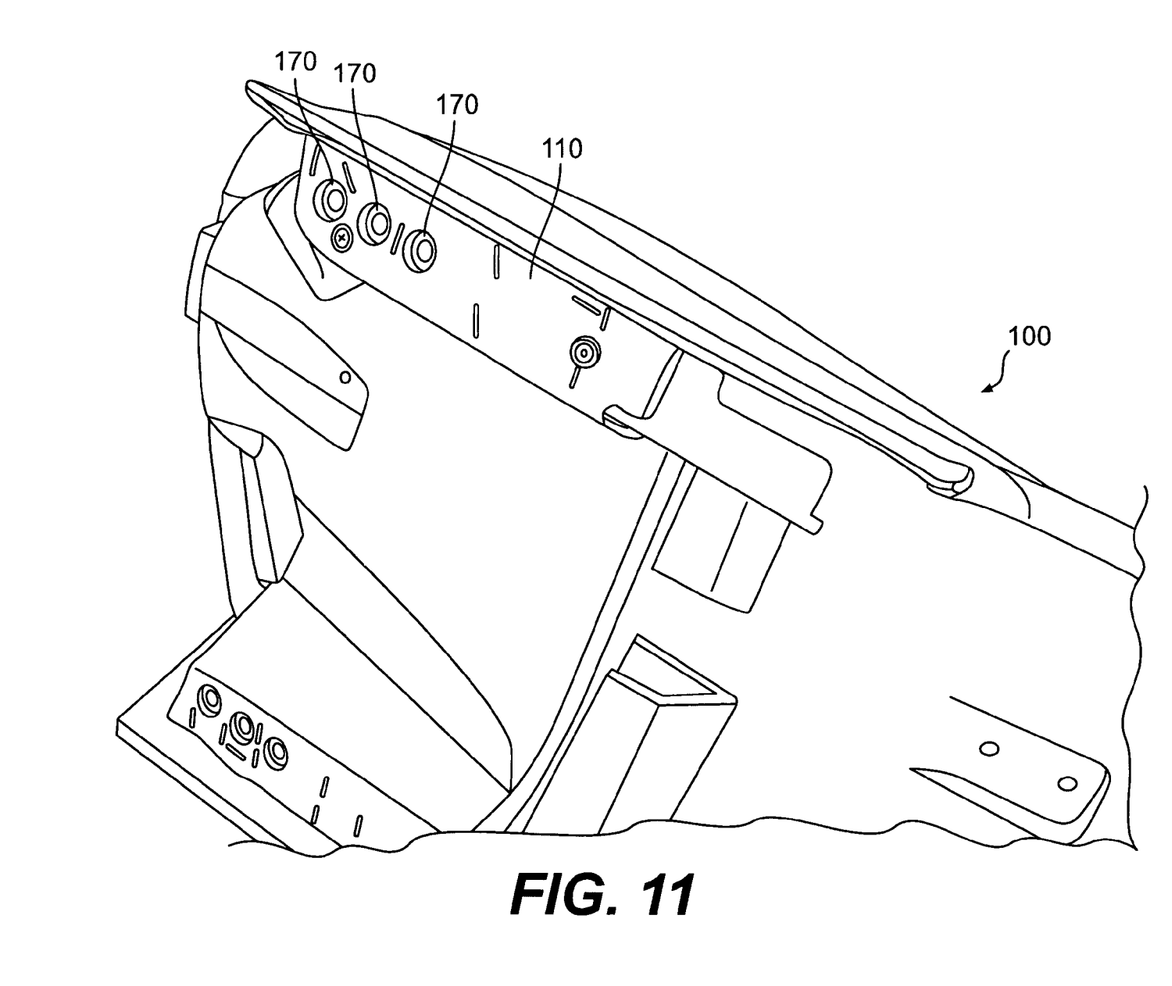
FIG. 11 is a perspective view of an underside of the adjustable seat showing threaded holes for discretely positioning the seat relative to the snowmobile chassis.

FIG. 11 is a perspective view of the underside 112 of the base 110 of the adjustable seat 100 in accordance with an embodiment of the present invention. In this embodiment, there are three tapped (threaded) holes 170 provided to receive corresponding threaded fasteners (not shown in this figure) for securing the adjustable seat 100 relative to the chassis 16. As persons of ordinary skill in the art will readily appreciate, the number of holes can be varied to provide more or fewer positions. Other known types of fasteners can also be substituted to provide a detachable connection for selectively adjusting the position of the seat.

In the foregoing embodiments, the adjustable seat 100 can be secured relative to the chassis at a discrete number of positions. In other words, the adjustable seat 100 can be secured at one of a plurality of discrete positions to provide incremental, stepwise adjustment of the seat.

In yet a further embodiment, the adjustable seat 100 can have infinitely variable adjustment by providing a connector (or a plurality of connectors) that is variably adjustable. For example, a gripping or clamping assembly would enable the base of the seat to frictionally engage the chassis at any position from the forward position to the rearward position, thereby providing infinitely variable adjustment of the seat. For example, a clamping lock would enable a user to finely adjust the position of the seat relative to the chassis and then to lock the seat to the chassis. Any number of known clamping, gripping or locking devices can be used to frictionally immobilize the seat relative to the chassis.

In yet a further embodiment shown in, the slidable coupling of the adjustable seat 100 has a pair of C-shaped extensions 172 protruding forwardly from the base of the seat. The C-shaped extensions 172 are slidably received within a respective pair of larger C-shaped channels 174 formed in the tunnel 18 of the chassis 16. The larger C-shaped channels 174 have inner dimensions corresponding to outer dimensions of the C-shaped extensions 172, thereby constraining the C-shaped extensions 172 to move only linearly relative to the C-shaped channels 174. As will be appreciated by those of ordinary skill in the art, the slidable coupling 150 can be any sliding joint (also known as a prismatic joint) that enables linear displacement (i.e., translation) of the adjustable seat relative to the chassis.

The adjustable seat 100 is a straddle-type seat commonly found on snowmobiles. The present invention therefore can be applied to either types of straddle-type vehicles, such as personal watercraft or all-terrain vehicles where seat adjustability is desirable so as to optimally accommodate a driver on the seat.

Modifications and improvements to the above-described embodiment of the present invention may become apparent to those skilled in the art. The foregoing description is intended to be exemplary rather than limiting. The scope of the present invention is therefore intended to be limited solely by the scope of the appended claims.

I claim:
1. A snowmobile comprising:
a chassis;

an engine disposed on the chassis at a forward end thereof;

two skis linked to the chassis by a front suspension system;

a steering device disposed on the chassis forward of the seat and being operatively connected to the skis for steering the snowmobile;

a drive track disposed below the chassis and mounted on a rear suspension system, said drive track being operatively connected to the engine for propulsion of the snowmobile;

a fuel tank disposed on the chassis rearward of the engine; and an adjustable seat disposed on the chassis immediately behind the fuel tank, the adjustable seat including a base having an upper sitting portion for accommodating a driver of the snowmobile, the base being movable between a plurality of positions along a longitudinal centerline of the snowmobile, and at least one element securing the adjustable seat in position along the longitudinal centerline.

2. The snowmobile as claimed in claim 1, wherein the at least one element comprises a plurality of threaded fasteners for engaging a respective plurality of threaded holes for securing the adjustable seat at one of the plurality of positions thereby providing incremental, stepwise adjustment of the seat.

3. The snowmobile as claimed in claim 1, further comprising a gripping assembly enabling the base of the seat to frictionally engage the chassis at any position along the longitudinal centerline, thereby providing infinitely variable adjustment of the seat between a forward and rearward position.

4. The snowmobile as claimed in claim 1, wherein the adjustable seat further comprises a coupling between the base and the chassis, the coupling being a prismatic joint comprising a first member slidably constrained for linear motion within a second member.

5. The snowmobile as claimed in claim 1, wherein the adjustable seat further comprises a coupling between the base and the chassis, the coupling comprising a tongue protruding forwardly from the base of the seat for engaging a rearward-facing slot formed within the fuel tank immediately forward of the seat.

6. The snowmobile as claimed in claim 5, wherein the tank comprises a molded U-shaped cavity defining the slot.

7. The snowmobile as claimed in claim 1, wherein the adjustable seat further comprises a coupling between the base and the chassis, the coupling comprising a pair of C-shaped extensions protruding forwardly from the base of the seat, the C-shaped extensions being slidably received within a respective pair of larger C-shaped channels formed in a chassis of the chassis, the larger C-shaped channels having inner dimensions corresponding to outer dimensions of the C-shaped extensions, thereby constraining the C-shaped extensions to move only linearly relative to the C-shaped channels.

8. The snowmobile as claimed in claim 1, wherein the adjustable seat further comprises a foam padding disposed on the base; and a leather cover for covering the base and the foam padding, the leather cover having a pair of downwardly depending skirts, each skirt including a plurality of connectors for detachably securing the seat to the chassis.

9. The snowmobile as claimed in claim 8 wherein the connectors are snap-on buttons.

10. A method of adjusting a seat for ergonomically accommodating a driver on a snowmobile having, a chassis;

an engine disposed on the chassis at a forward end thereof;

two skis linked to the chassis by a front suspension system;

a steering device disposed on the chassis forward of the seat and being operatively connected to the at least one ski for steering the snowmobile;

a drive track disposed below the chassis and mounted on a rear suspension system, said drive track being operatively connected to the engine for propulsion of the snowmobile;

a fuel tank disposed on the chassis rearward of the engine; and an adjustable seat disposed on the chassis immediately behind the fuel tank, the method comprising the steps of:

sliding the adjustable seat between a forward position and a rearward position; and securing the adjustable seat to preclude movement of the seat relative to the longitudinal centerline.

11. The method as claimed in claim 10, wherein the step of securing the adjustable seat comprises the step of fastening a plurality of threaded fasteners into respective threaded holes at discrete positions thereby providing incremental, stepwise adjustment of the seat.

12. A snowmobile comprising:

a chassis;

an engine disposed on the chassis at a forward end thereof;

two skis linked to the chassis by a front suspension system;

a steering device disposed on the chassis forward of the seat and being operatively connected to the skis for steering the snowmobile;

a drive track disposed below the chassis and mounted to a rear suspension system, said drive track being operatively connected to the engine for propulsion of the snowmobile;

a fuel tank disposed on the chassis rearward of the engine; and an adjustable seat disposed on the chassis immediately behind the fuel tank such that a driver seated on the seat may operate the snowmobile, the adjustable seat being movable between a forward position and a rearward position relative to a longitudinal centerline of the vehicle.

13. The snowmobile of claim 12, wherein at least a portion of the adjustable seat is always in contact with the fuel tank.

14. The snowmobile of claim 12, wherein at least a portion of the adjustable seat is constructed to interface with the fuel tank.

15. The snowmobile of claim 12, wherein at least a portion of the adjustable seat is constructed to interlock with the fuel tank.

16. The snowmobile of claim 12, wherein the adjustable seat includes a molded plastic base supporting a foam padding defining an upper sitting area for the driver of the snowmobile.

* * * * *